(12) United States Patent
Lin

(10) Patent No.: US 10,396,674 B2
(45) Date of Patent: Aug. 27, 2019

(54) FLYBACK POWER CONVERTER CIRCUIT AND PRIMARY SIDE CONTROLLER CIRCUIT THEREOF

(71) Applicant: RICHTEK TECHNOLOGY CORPORATION, Zhubei, Hsinchu (TW)

(72) Inventor: Kun-Yu Lin, Hsinchu (TW)

(73) Assignee: RICHTEK TECHNOLOGY CORPORATION, Zhubei, Hsinchu (TW)

( * ) Notice: Subject to any disclaimer, the term of this patent is extended or adjusted under 35 U.S.C. 154(b) by 0 days.

(21) Appl. No.: 16/023,565

(22) Filed: Jun. 29, 2018

(65) Prior Publication Data

US 2019/0013740 A1  Jan. 10, 2019

Related U.S. Application Data

(60) Provisional application No. 62/528,928, filed on Jul. 5, 2017.

(30) Foreign Application Priority Data

Nov. 24, 2017  (CN) .......................... 2017 1 1193092

(51) Int. Cl.
*H02M 3/335* (2006.01)
*H02M 1/36* (2007.01)
(Continued)

(52) U.S. Cl.
CPC ......... *H02M 3/33569* (2013.01); *H02M 1/08* (2013.01); *H02M 1/32* (2013.01);
(Continued)

(58) Field of Classification Search
CPC ............ H02M 1/08; H02M 1/32; H02M 1/36; H02M 3/33507; H02M 3/33523;
(Continued)

(56) References Cited

U.S. PATENT DOCUMENTS 7,633,776 B2 * 12/2009 Usui ................. H02M 3/33523
361/91.6
8,125,798 B2 *  2/2012 Huynh ................. H02M 3/335
363/147

(Continued)

*Primary Examiner* — Yemane Mehari
(74) *Attorney, Agent, or Firm* — Tung & Associates

(57) ABSTRACT

A flyback power converter includes a transformer having a primary winding for receiving an input power, a secondary winding for generating an output power, and an auxiliary winding for generating a supply voltage, a primary side switch coupled to the primary winding, a high voltage start-up switch coupled to the input voltage and the controller supply voltage, and a primary side controller powered by the controller supply voltage. The primary side controller includes a multi-function pin coupled to a control terminal of the high voltage start-up switch, a high voltage start-up circuit for controlling the high voltage start-up switch to be ON through the multi-function pin when the controller supply voltage is lower than a threshold, and a protection control circuit which is coupled to an protection sensing signal through the multi-function pin; the protection control circuit operates the flyback power converter according to the protection sensing signal.

22 Claims, 7 Drawing Sheets

(51) Int. Cl.
*H02M 1/08* (2006.01)
*H02M 1/32* (2007.01)
(52) U.S. Cl.
CPC ......... *H02M 1/36* (2013.01); *H02M 3/33507* (2013.01); *H02M 2001/327* (2013.01)
(58) Field of Classification Search
CPC ........ H02M 3/33569; H02M 2001/327; Y02B 70/126; Y02B 70/1433
USPC .......................... 363/21.01–21.18, 125, 147
See application file for complete search history.

(56) References Cited

U.S. PATENT DOCUMENTS

| | | | | |
|---|---|---|---|---|
| 8,964,422 | B2* | 2/2015 | Shi | H02M 1/44 363/21.13 |
| 2003/0174528 | A1* | 9/2003 | Wong | H02M 1/36 363/147 |
| 2004/0218410 | A1* | 11/2004 | Yamada | H02M 1/36 363/125 |
| 2010/0061126 | A1* | 3/2010 | Huynh | H02M 3/33507 363/21.12 |
| 2010/0309689 | A1* | 12/2010 | Coulson | H02M 3/33507 363/16 |
| 2014/0355314 | A1* | 12/2014 | Ryan | H02M 3/33507 363/21.01 |
| 2017/0005583 | A1 | 1/2017 | Choi | |

\* cited by examiner

FLYBACK POWER CONVERTER CIRCUIT AND PRIMARY SIDE CONTROLLER CIRCUIT THEREOF

CROSS REFERENCE

The present invention claims priority to U.S. 62/528,928, filed on Jul. 5, 2017, and to CN 201711193092.X, filed on Nov. 24, 2017.

BACKGROUND OF THE INVENTION

Field of Invention

The present invention relates to a flyback power converter circuit; particularly, it relates to a flyback power converter circuit with a multi-function pin which can provide multiple functions. The present invention also relates to a primary side controller circuit for use in the flyback power converter circuit.

Description of Related Art

FIG. 1 shows a prior art flyback power converter circuit (flyback power converter circuit 1) which comprises a transformer 10, a primary side switch N1, a primary side controller circuit 30, and a high-voltage (HV) start-up switch SSU. An auxiliary winding WA generates a controller supply voltage VDD to supply power to the primary side controller 30. The HV start-up switch SSU is controlled by the primary side controller circuit 30 through a pin ASU. During start-up stage wherein the controller supply voltage VDD is lower than a start-up threshold, the HV start-up switch SSU is controlled to be conductive, so as to conduct the input voltage VIN to charge the supply capacitor CDD directly, such that the controller supply voltage VDD is charged up rapidly to be ready to supply power to the primary side controller 30.

The prior art in FIG. 1 has a drawback that an extra dedicated pin ASU is required to control the HV start-up switch SSU, which leads to higher cost and larger circuit size.

Compared to the prior art in FIG. 1, the present invention is advantageous in using a multi-function pin to control the HV start-up switch SSU for rapid power start-up, while the same multi-function pin can provide other functions such as over temperature protection, overvoltage protection, etc.; thus, the total number of pins is reduced, whereby the cost and the circuit size are reduced.

A relevant prior patent is US 2017/0005583 A1, which solves the issue by a different approach from the present invention.

SUMMARY OF THE INVENTION

From one perspective, the present invention provides a flyback power converter circuit which comprises: a transformer, having a primary side winding for receiving an input voltage; a secondary side winding for generating an output voltage; and an auxiliary winding for generating an auxiliary voltage and providing a controller supply voltage; a primary side switch, coupled to the primary side winding and configured to operably control the primary side winding; a high voltage (HV) start-up switch, wherein a current inflow terminal of the HV start-up switch is coupled to an input voltage related signal, and a current outflow terminal of the HV start-up switch is coupled to the controller supply voltage, wherein the input voltage related signal relates to the input voltage; a protection sensing circuit, configured to operably sense a system temperature or an input signal to generate a protection sensing signal; and a primary side controller circuit, which is located at a primary side of the transformer and powered by the controller supply voltage, and is configured to operably generate a switch control signal to control the primary side switch; the primary side controller circuit including: a multi-function pin, which is coupled to a control terminal of the HV start-up switch and is coupled to the protection control circuit; a high voltage (HV) start-up circuit, coupled to the control terminal of the HV start-up switch through the multi-function pin, wherein when the controller supply voltage does not exceed a start-up voltage threshold, the HV start-up circuit controls the HV start-up switch to be ON, and when the controller supply voltage exceeds the start-up voltage threshold, the HV start-up circuit controls the HV start-up switch to be OFF; and a protection control circuit, configured to operably receive the protection sensing signal through the multi-function pin, wherein when the controller supply voltage exceeds the start-up voltage threshold, the protection control circuit performs a protection operation according to whether the protection sensing signal exceeds a protection threshold.

In one embodiment, the input voltage related signal is directly coupled to the input voltage.

In one embodiment, the flyback power converter circuit further comprises a rectifier circuit which is configured to operably rectify an AC input signal to generate the input voltage, wherein the input voltage related signal is coupled to a positive terminal or a negative terminal of the AC input signal.

In one embodiment, the HV start-up circuit includes: a comparison circuit, configured to operably compare the controller supply voltage and a reference voltage to generate a comparison output signal, wherein the reference voltage has a level relating to the start-up voltage threshold; and a start-up control switch, wherein a current inflow terminal and a current outflow terminal of the start-up control switch are coupled between the controller supply voltage and the multi-function pin, and a control terminal of the start-up control switch is coupled to the comparison output signal, wherein when the controller supply voltage does not exceed the start-up voltage threshold, the start-up control switch is controlled to be ON to turn ON the HV start-up switch, and when the controller supply voltage exceeds the start-up voltage threshold, the start-up control switch is controlled to be OFF to turn OFF the HV start-up switch.

In one embodiment, the protection control circuit includes: a biasing circuit, configured to operably provide a bias current and/or a bias voltage when the controller supply voltage exceeds the start-up voltage threshold, wherein the protection sensing circuit further generates the protection sensing signal according to the bias current and/or the bias voltage; and a comparison circuit, configured to operably compare the protection sensing signal and a reference voltage to generate a comparison output signal, wherein the reference voltage has a level relating to the protection threshold, and the protection control circuit performs the protection operation according to the comparison output signal.

In one embodiment, the biasing circuit includes a current source and a diode-connected transistor which are coupled to each other and are configured to operably generate the bias current and/or the bias voltage on the multi-function pin.

In one embodiment, the protection sensing circuit includes a temperature sensitive resistor, wherein the protection control circuit determines whether the system temperature exceeds a temperature threshold according to whether the protection sensing signal exceeds the reference voltage, and performs the protection operation when the system temperature exceeds the temperature threshold.

In one embodiment, the protection sensing circuit includes a sensing switch coupled between the multi-function pin and a predetermined voltage, wherein the input signal is coupled to a control terminal of the sensing switch, wherein the protection control circuit determines whether the input signal exceeds an input signal threshold according to whether the protection sensing signal exceeds the reference voltage, and the protection control circuit performs the protection operation when the input signal exceeds the input signal threshold.

In one embodiment, the protection threshold is determined according to a conduction threshold of the HV start-up switch, such that when the controller supply voltage exceeds the start-up voltage threshold and when the protection sensing signal does not exceed the protection threshold, the HV start-up switch is OFF.

In one embodiment, when the controller supply voltage exceeds the start-up voltage threshold, the protection control circuit operates the primary side switch according to the protection sensing signal.

In one embodiment, the flyback power converter circuit further comprises a reverse blocking diode which is coupled in series with the HV start-up switch to prevent a reverse current and/or to reduce a voltage applied on the HV start-up switch.

From another perspective, the present invention provides a primary side controller circuit configured to operably control a flyback power converter circuit. The flyback power converter circuit includes a transformer, having a primary side winding for receiving an input voltage; a secondary side winding for generating an output voltage; and an auxiliary winding for generating an auxiliary voltage and providing a controller supply voltage; a primary side switch, coupled to and configured to operably control the primary side winding; a high voltage (HV) start-up switch, wherein a current inflow terminal of the HV start-up switch is coupled to an input voltage related signal, and a current outflow terminal of the HV start-up switch is coupled to the controller supply voltage, wherein the input voltage related signal relates to the input voltage; and a protection sensing circuit, configured to operably sense a system temperature or an input signal to generate a protection sensing signal; the primary side controller circuit being located at a primary side of the transformer and powered by the controller supply voltage, and configured to operably generate a switch control signal to control the primary side switch; the primary side controller circuit comprising: a multi-function pin, which is coupled to a control terminal of the HV start-up switch and is coupled to the protection control circuit; a high voltage (HV) start-up circuit, coupled to the control terminal of the HV start-up switch through the multi-function pin, wherein when the controller supply voltage does not exceed a start-up voltage threshold, the HV start-up circuit controls the HV start-up switch to be ON, and when the controller supply voltage exceeds the start-up voltage threshold, the HV start-up circuit controls the HV start-up switch to be OFF; and a protection control circuit, configured to operably receive the protection sensing signal through the multi-function pin, wherein when the controller supply voltage exceeds the start-up voltage threshold, the protection control circuit performs a protection operation according to whether the protection sensing signal exceeds a protection threshold.

The objectives, technical details, features, and effects of the present invention will be better understood with regard to the detailed description of the embodiments below.

DESCRIPTION OF THE PREFERRED EMBODIMENTS

The drawings as referred to throughout the description of the present invention are for illustration only, to show the interrelations between the circuits and the signal waveforms, but not drawn according to actual scale.

Figure 1:
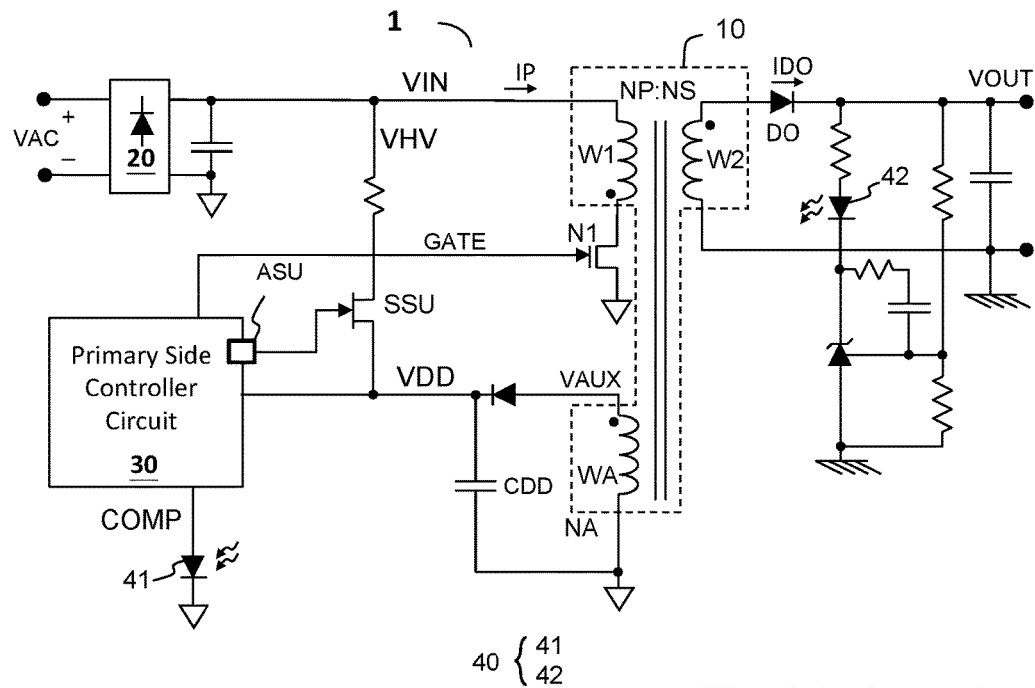
FIG. 1 shows a schematic diagram of a prior art flyback power converter circuit.
Figure 2A:
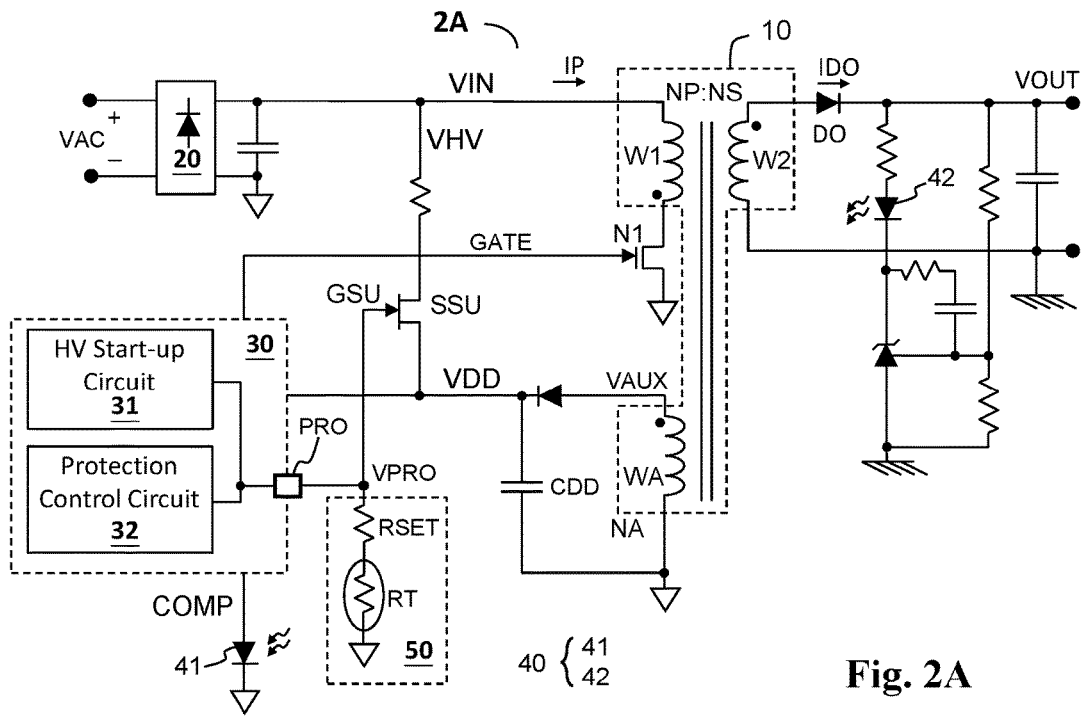
FIGS. 2A-2C show schematic diagrams of embodiments of a flyback power converter circuit and a primary side controller circuit thereof according to the present invention.

FIG. 2A shows one embodiment of the flyback power converter circuit according to the present invention (flyback power converter circuit 2A). The flyback power converter circuit 2A comprises a transformer 10, a primary side switch N1, and a primary side controller circuit 30. The transformer 10 has a primary side winding W1, a secondary side winding W2, and an auxiliary winding WA. The primary side winding W1 receives an input voltage VIN. The secondary side winding W2 generates an output voltage VOUT. The auxiliary winding WA generates an auxiliary voltage VAUX and provides a controller supply voltage VDD, wherein the controller supply voltage VDD relates to the auxiliary voltage VAUX. In one embodiment, the controller supply voltage VDD is obtained by, for example but not limited to, rectifying, filtering or regulating the auxiliary voltage VAUX. The protection sensing circuit 50 senses a system temperature or an input signal VS to generate a protection sensing signal VPRO. In one embodiment, the protection sensing circuit 50 includes a temperature resistor RT to sense the system temperature. The primary side switch N1 is coupled to the primary side winding W1. The primary side controller circuit 30 is located at a primary side of the transformer 10 and powered by the controller supply voltage VDD, and is configured to operably generate a switch control signal GATE to control the primary side switch N1 which controls the primary side winding W1. In one embodiment, the primary side controller circuit 30 may generate a switch control signal GATE in PWM (pulse width modulation) form according to the feedback compensation signal COMP, to control the primary side switch N1. In one embodiment, the flyback converter circuit 2A may obtain secondary side information through a coupling device 40 for feedback control. In another embodiment, the flyback converter circuit 2A may perform feedback control according to feedback information provided from the primary side, for example the auxiliary voltage VAUX. In this case, the coupling device 40 may be omitted. In one embodiment, the primary side controller circuit 30 may further sense a current related signal to control the primary side switch N1, wherein the current related signal relates to for example but not limited to a primary side winding current, a primary side switch current through the primary side switch N1, or a secondary side winding current.

Figure 2B:
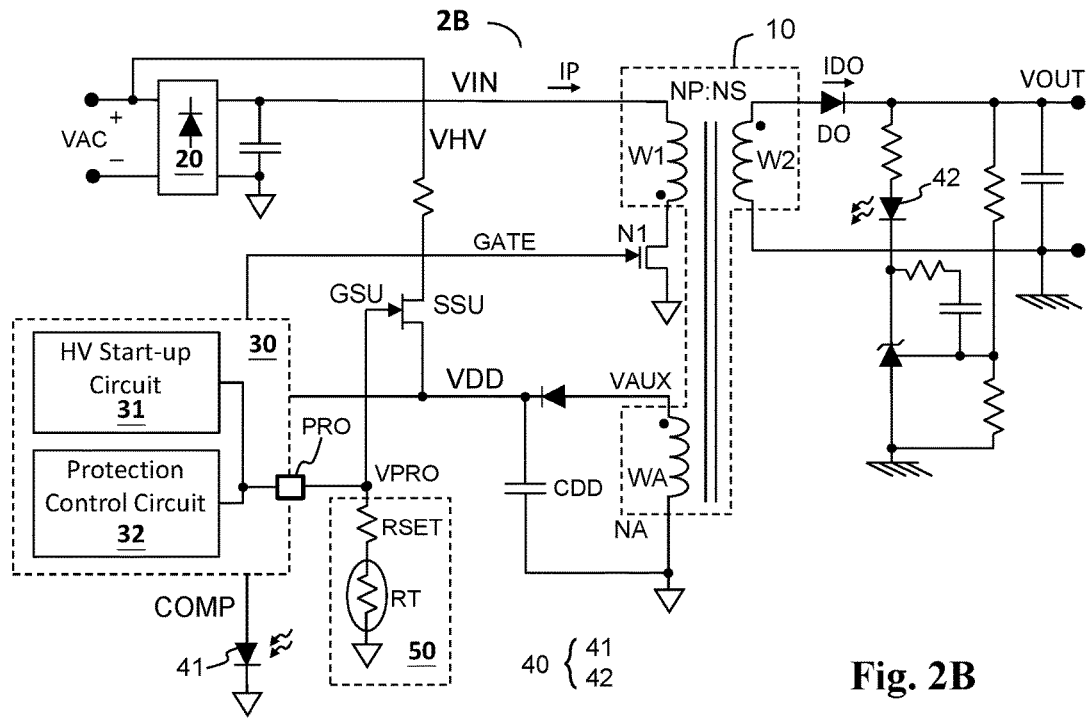
Figure 2C:
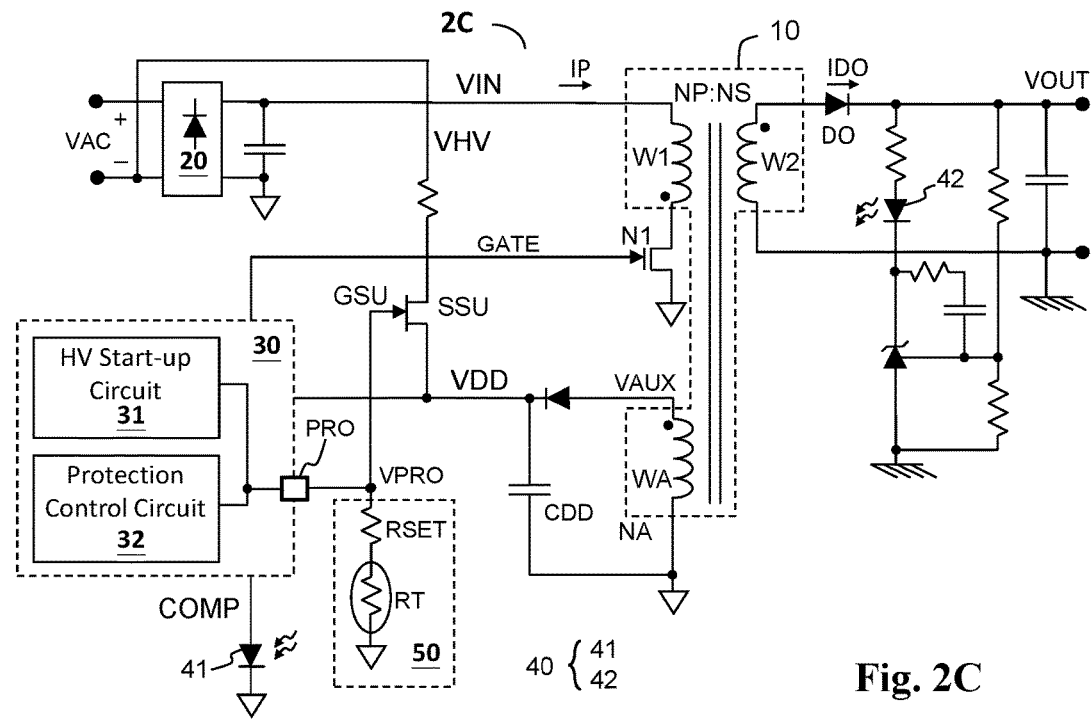
Figure 9A:
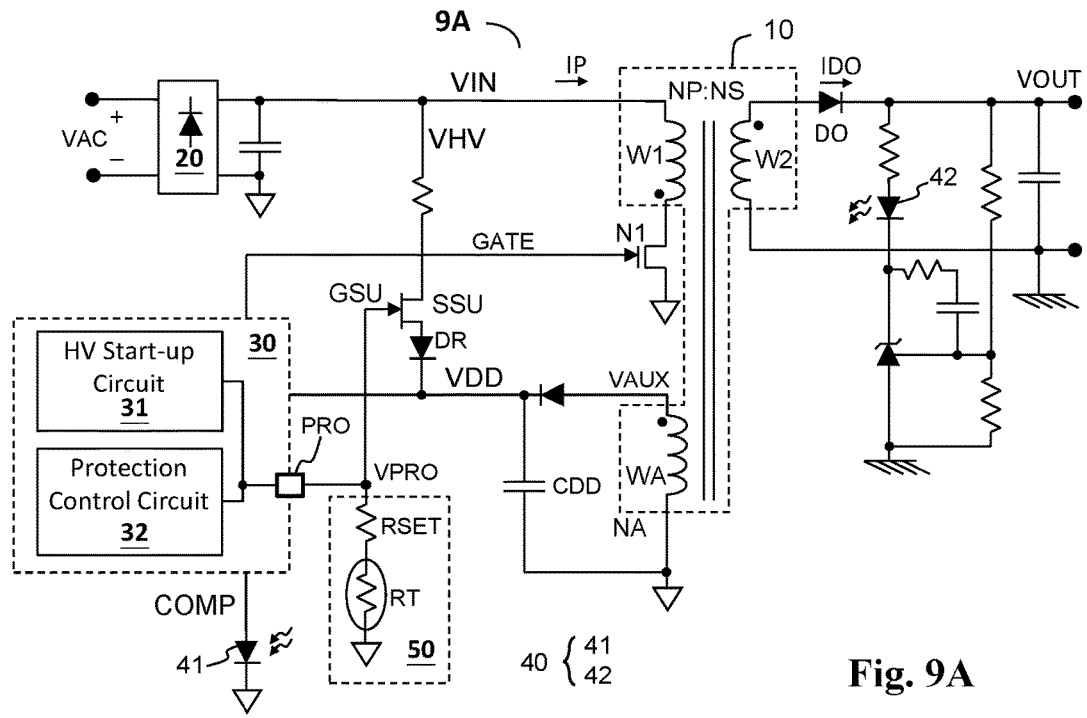
FIGS. 9A-9C show schematic diagrams of embodiments of flyback power converter circuits and primary side controller circuits thereof according to the present invention.
Figure 9B:
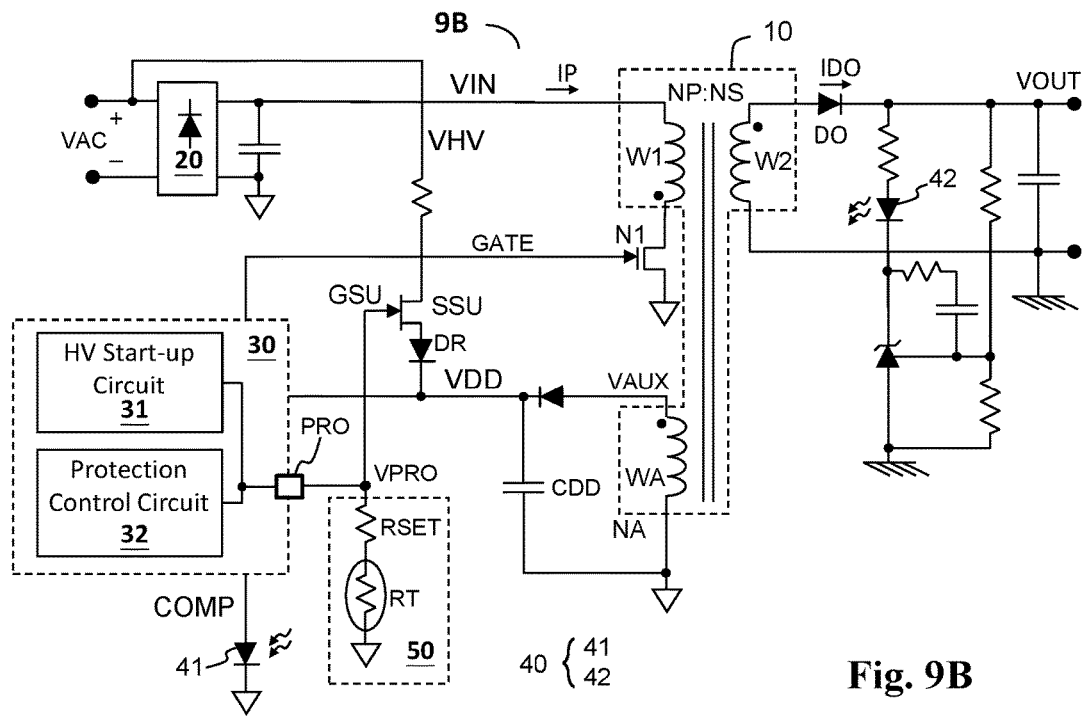
Figure 9C:
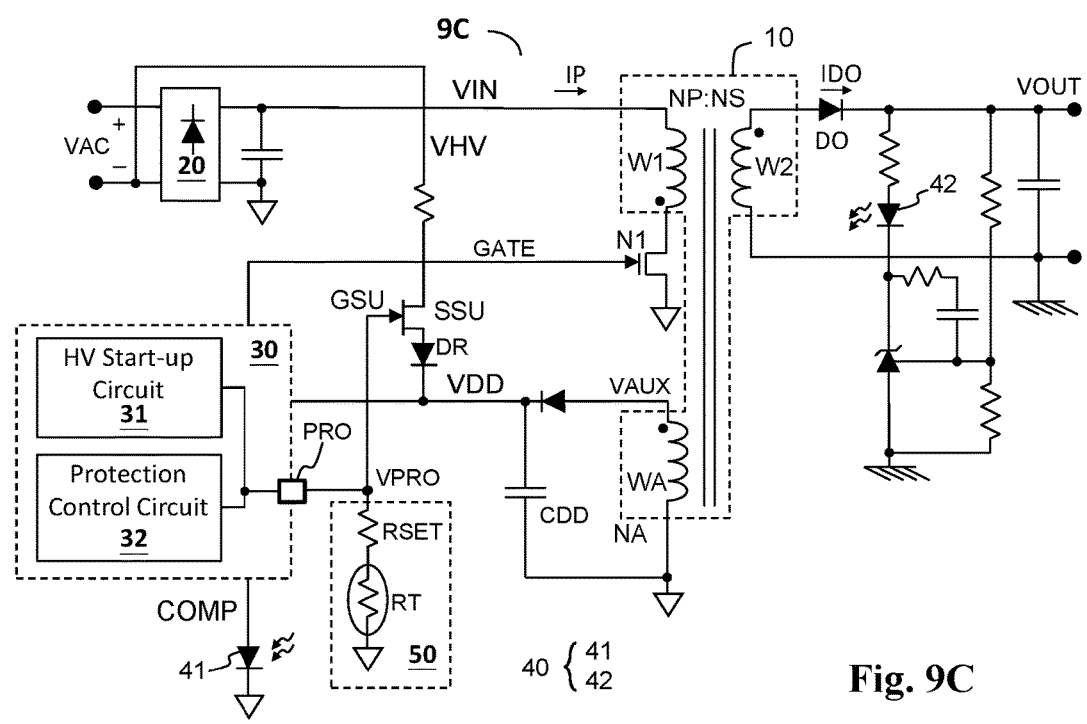

Still referring to FIG. 2A, in one embodiment, a current inflow terminal of the HV start-up switch SSU is coupled to an input voltage related signal VHV, and a current outflow terminal of the HV start-up switch SSU is coupled to the controller supply voltage VDD, wherein the input voltage related signal VHV relates to the input voltage VIN. In one embodiment, as shown in FIG. 2A, the input voltage related signal VHV is directly coupled to the input voltage VIN. Also referring to FIGS. 2B and 2C, in another embodiment, as shown in FIGS. 2B and 2C, the flyback power converter circuit (flyback power converter circuit 2B or 2C) includes a rectifier circuit 20 which rectifies the AC input signal VAC to generate the input voltage VIN, wherein the input voltage related signal VHV is coupled to a positive terminal (as shown in FIG. 2B) or a negative terminal (as shown in FIG. 2C) of the AC input signal VAC. In one embodiment, the HV start-up switch SSU may be for example but not limited a JFET transistor. In one embodiment, the flyback power converter may include a reverse blocking diode (such as DR shown in FIGS. 9A-9C) which is coupled in series with the HV start-up switch, between the input voltage related signal and the current outflow terminal of the HV start-up switch, to prevent a reverse current which may flow from the controller supply voltage VDD to the input voltage related signal VHV. In one embodiment, the reverse diode may also reduce the voltage that the HV start-up switch has to withstand (for example when the reverse blocking diode is reverse biased), so that a HV start-up switch SSU with lower voltage specification can be used to reduce cost.

Still referring to FIG. 2A, in one embodiment, the primary side controller circuit 30 includes a multi-function pin PRO, a high voltage (HV) start-up circuit 31, and a protection control circuit 32. The high voltage (HV) start-up circuit 31 is coupled to the control terminal GSU of the HV start-up switch SSU through the multi-function pin PRO, wherein when the controller supply voltage VDD does not exceed a start-up voltage threshold VTH (i.e. the controller supply voltage VDD has not reached the normal operating voltage of the primary side controller circuit 30), the HV start-up circuit 31 controls the HV start-up switch SSU to be ON, such that the input voltage VIN can directly charge the supply capacitor CDD to rapidly raise the controller supply voltage VDD to the normal operating voltage to complete the start-up operation. When the controller supply voltage VDD exceeds the start-up voltage threshold VTH (i.e. the controller supply voltage VDD has reached the normal operating voltage of the primary side controller circuit 30), the HV start-up circuit 31 controls the HV start-up switch SSU to be OFF.

The protection control circuit 32 receives the protection sensing signal VPRO through the multi-function pin PRO. When the controller supply voltage VDD exceeds the start-up voltage threshold VTH, the protection control circuit 32 performs a protection operation such as over temperature protection, over voltage protection, under voltage protection, etc., depending on the design requirement, according to whether the protection sensing signal VPRO exceeds a protection threshold VTHP. The protection operation may include one or more of the following actions: forcing the flyback power converter circuit to stop operating, forcing the flyback power converter circuit to reboot, stopping switching the primary side switch, stopping the operation of or restarting the primary side controller circuit, and/or noticing other circuit units or users.

Figure 3:
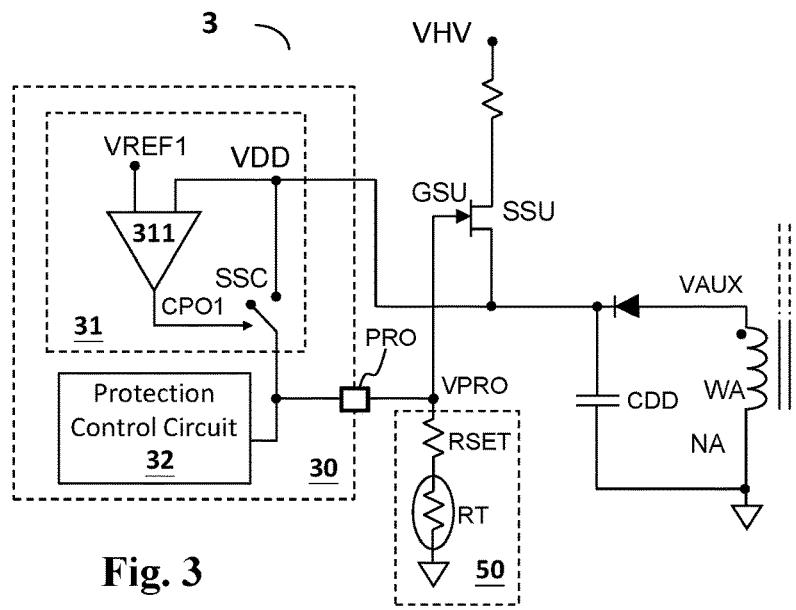
FIG. 3 shows a schematic diagram of an embodiment of a flyback power converter circuit and a HV start-up circuit thereof according to the present invention.

Referring to FIG. 3 which shows a schematic diagram of an embodiment of the flyback power converter circuit and the HV start-up circuit (HV start-up circuit 31) thereof according to the present invention. The HV start-up circuit 31 includes a comparison circuit 311 and a start-up control switch SSC. The comparison circuit 311 is configured to operably compare the controller supply voltage VDD with a reference voltage VREF1 to generate a comparison output signal CPO1, wherein the level of the reference voltage VREF1 relates to the start-up voltage threshold VTH. In one embodiment, the reference voltage VREF1 may be equal to or may be a predetermined multiple/ratio of the start-up voltage threshold VTH. A current inflow terminal and a current outflow terminal of the start-up control switch SSC are coupled between the controller supply voltage VDD and the multi-function pin PRO, and a control terminal of the start-up control switch SSC is coupled to the comparison output signal CPO1. When the controller supply voltage VDD does not exceed the start-up voltage threshold VTH, the start-up control switch SSC is controlled to be ON to turn ON the HV start-up switch SSU, such that the input voltage related voltage VHV (which is for example the input voltage VIN itself) can directly charge the supply capacitor CDD to rapidly raise the controller supply voltage VDD to the normal operating voltage to complete the start-up operation. When the controller supply voltage VDD exceeds the start-up voltage threshold VTH, the start-up control switch SSC is controlled to be OFF to turn OFF the HV start-up switch SSU. In this embodiment, the HV start-up switch SSU is a JFET transistor whose conduction threshold is a negative value.

Figure 4:
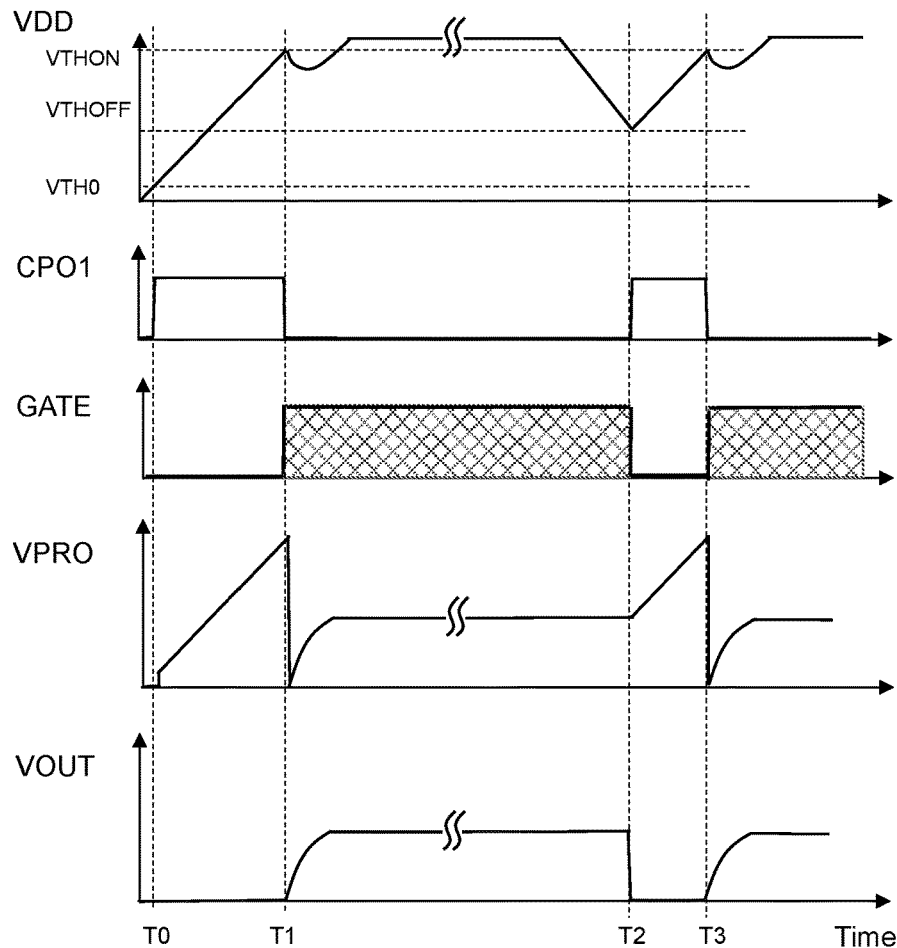
FIG. 4 shows schematic waveforms corresponding to the embodiments of the flyback power converter circuit according to the present invention.

Referring to FIG. 4, FIG. 4 shows schematic waveforms corresponding to the embodiments of the flyback power converter circuit according to the present invention. During power start-up stage (for example T0-T1), the controller supply voltage VDD is lower than the start-up voltage threshold VTH (i.e. VTHON shown in the figure); the start-up control switch SSC is controlled to be ON (CPO1 is at high level) to turn ON the HV start-up switch SSU. During this period, the voltage on the multi-function pin PRO (i.e. the protection sensing signal VPRO) rises as the controller supply voltage VDD rises. When the controller supply voltage VDD reaches the start-up voltage threshold VTH (i.e. T1), the start-up control switch SSC is controlled to be OFF (CPO1 is at low level) to turn OFF the HV start-up switch SSU. At this time point, since the controller supply voltage VDD has reached the required normal operating level of the primary side controller circuit 30, the primary side controller circuit 30 can start operating the primary side switch N1 (i.e. the signal GATE starts switching in for example PWM form) so that the output voltage VOUT starts rising, whereby the auxiliary voltage VAUX also starts rising, to maintain the controller supply voltage VDD. In one embodiment, the start-up voltage threshold VTH may include a hysteresis arrangement, that is, when the controller supply voltage VDD falls from the normal operating level, the threshold voltage for the HV start-up switch SSU to be ON again is VTHOFF instead of VTHON, as shown in the figure. In this embodiment, from T2 to T3, the flyback power converter circuit is powered on (starts up) again.

Figure 5:
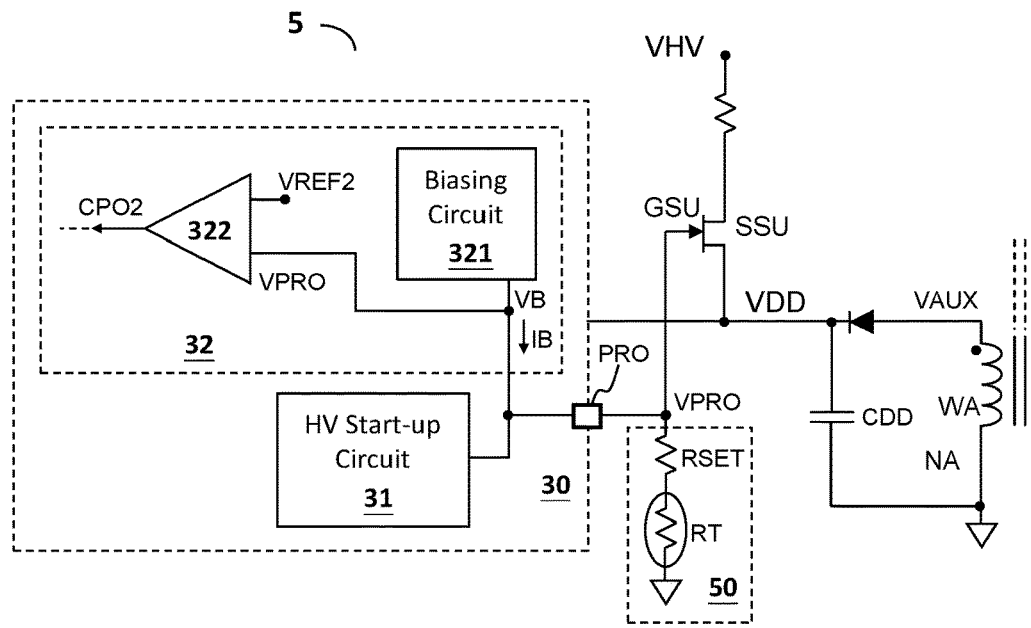
FIG. 5 shows a schematic diagram of an embodiment of a flyback power converter circuit and a protection control circuit thereof according to the present invention.

FIG. 5 shows a schematic diagram of an embodiment of a flyback power converter circuit and a protection control circuit (protection control circuit 32) thereof according to the present invention. The protection control circuit 32 includes a biasing circuit 321 and a comparison circuit 322. The biasing circuit 321 provides a bias current IB and/or a bias voltage VB when the controller supply voltage VDD exceeds the start-up voltage threshold VTH. The protection sensing circuit 50 further generates the protection sensing signal VPRO according to the bias current IB and/or the bias voltage VB. The comparison circuit 322 compares the protection sensing signal VPRO with a reference voltage VREF2 to generate a comparison output signal CPO2, wherein the reference voltage VREF2 has a level relating to the protection threshold VTHP. The protection control circuit 32 performs the aforementioned protection operation according to the comparison output signal CPO2.

Figure 6:
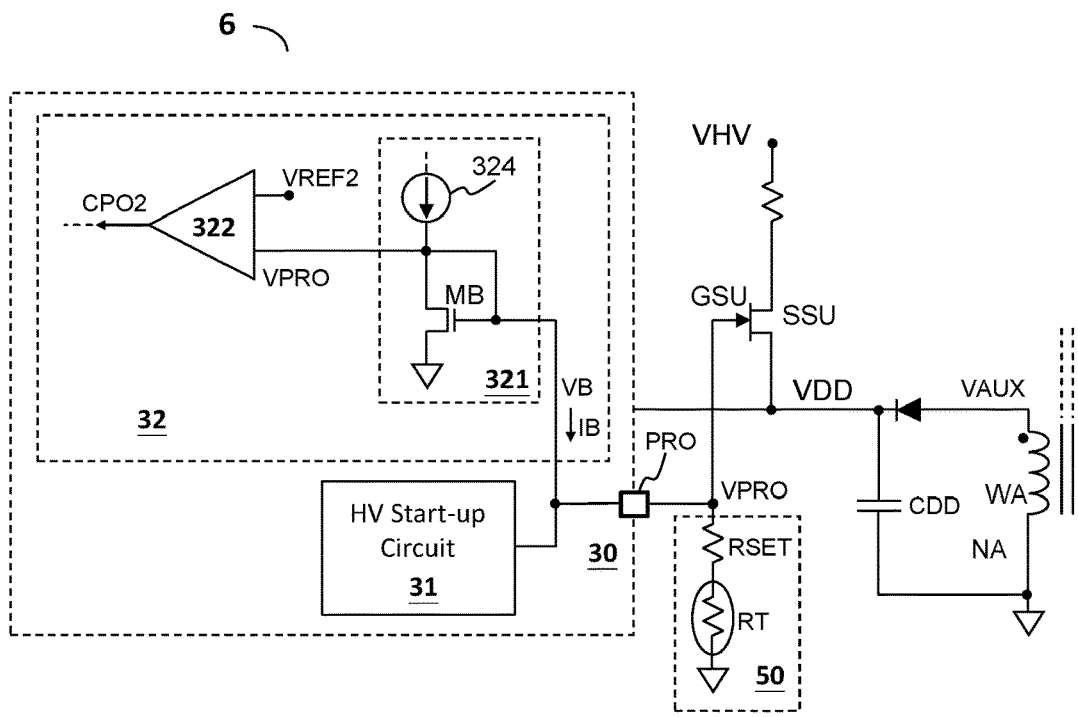
FIG. 6 shows a schematic diagram of an embodiment of a flyback power converter circuit and a protection control circuit thereof according to the present invention.

FIG. 6 shows a schematic diagram of an embodiment of a biasing circuit (biasing circuit 321) of the flyback power converter circuit according to the present invention. The biasing circuit 321 includes a current source 324 and a diode-connected transistor MB which are coupled to each other and configured to operably generate the bias current IB and/or the bias voltage VB on the multi-function pin PRO. The "diode-connected transistor", in one embodiment, is a MOS transistor whose gate is connected to the drain of the transistor so that the transistor operates substantially like a diode.

In one embodiment, when the controller supply voltage VDD exceeds the start-up voltage threshold VTH, the protection control circuit 32 determines whether the system temperature exceeds a temperature threshold VTT according to whether the protection sensing signal VPRO exceeds a reference voltage VTHP, and performs the protection operation when the system temperature exceeds the temperature threshold VTT. FIG. 6 also shows an embodiment of a protection sensing circuit (the protection sensing circuit 50) of the flyback power converter circuit according to the present invention. As shown in FIG. 6, the protection sensing circuit 50 includes a temperature sensitive resistor RT. In this embodiment, the temperature sensitive resistor RT may have a negative temperature coefficient. When the system temperature exceeds the temperature threshold VTT, the protection sensing signal VPRO will be lower than the protection threshold VTHP (i.e. VREF2), whereby the protection control circuit 32 can determine that the system temperature exceeds the temperature threshold VTT and perform the protection operation accordingly. In another embodiment, the temperature sensitive resistor RT may have a positive temperature coefficient. In this case, the over temperature protection can be achieved by adjusting the polarities of the related circuits correspondingly.

In one embodiment, when the controller supply voltage VDD exceeds the start-up voltage threshold VTH, the protection control circuit can determine whether the input signal VS exceeds an input signal threshold VTHS according to whether the protection sensing signal VPRO exceeds a protection threshold VTHP, and performs protection operations such as over voltage or under voltage protection when the input signal VS exceeds the input signal threshold VTHS.

Figure 7:
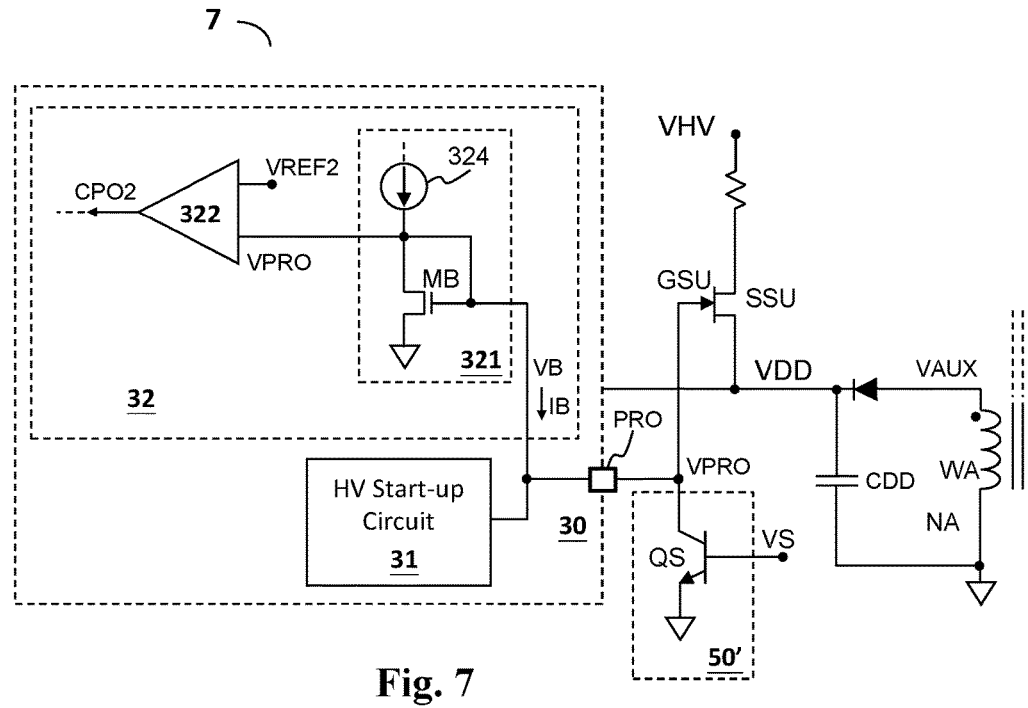
FIG. 7 shows a schematic diagram of another embodiment of a flyback power converter circuit and a protection control circuit thereof according to the present invention.

FIG. 7 shows a schematic diagram of another embodiment of the protection sensing circuit (protection sensing circuit 50') for use in the flyback power converter circuit according to the present invention. The protection sensing circuit 50' includes a sensing switch QS coupled between the multi-function pin PRO and a predetermined voltage (such as GND node as shown in the figure). The input signal VS is coupled to a control terminal of the sensing switch QS. In this embodiment, the protection control circuit 32 determines whether the input signal VS is higher than an input signal threshold VTHS according to whether the protection sensing signal VPRO is lower than the protection threshold VTHP (i.e. VREF2), and performs over voltage protection operation when the input signal VS exceeds the input signal threshold VTHS.

Figure 8:
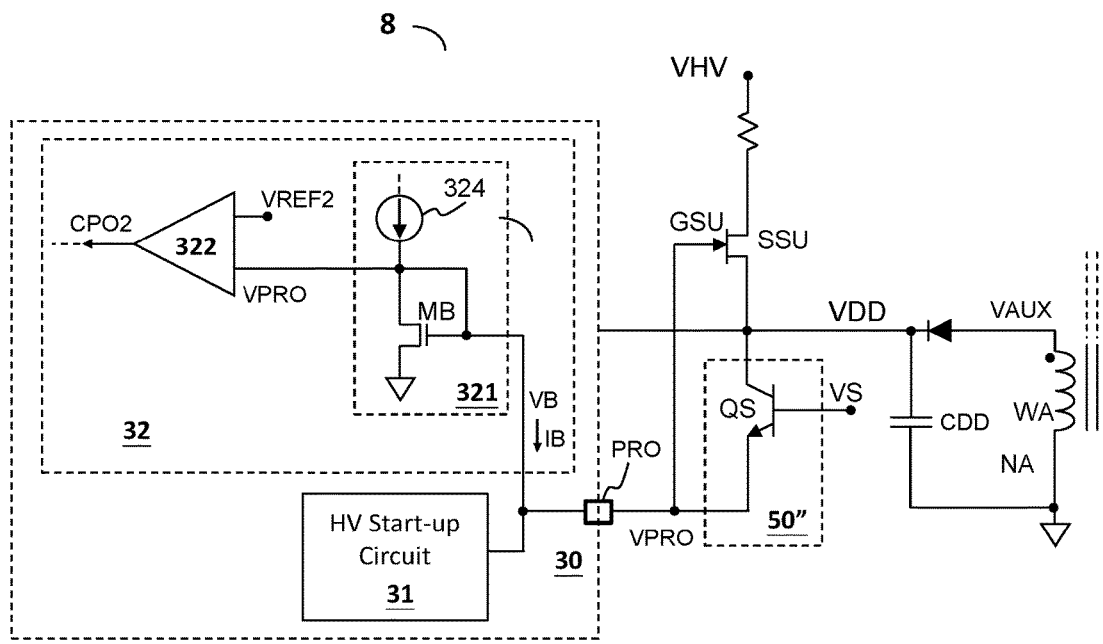
FIG. 8 shows a schematic diagram of an embodiment of a flyback power converter circuit and a protection control circuit thereof according to the present invention.

FIG. 8 shows a schematic diagram of another embodiment of the protection sensing circuit (protection sensing circuit 50") for use in the flyback power converter circuit according to the present invention. The protection sensing circuit 50" is similar to the protection sensing circuit 50' but differs in that the sensing switch QS is coupled between the multi-function pin PRO and the controller supply voltage VDD. The input signal VS is coupled to a control terminal of the sensing switch QS. In this embodiment, the protection control circuit 32 determines whether the input signal VS is higher than an input signal threshold VTHS according to whether the protection sensing signal VPRO is higher than the protection threshold VTHP (i.e. VREF2), and performs over voltage protection operation when the input signal VS is higher than the input signal threshold VTHS.

As described earlier, the flyback power converter circuit can control the HV start-up switch SSU to charge up the controller supply voltage VDD rapidly through the multi-function pin PRO during power start-up stage, and can perform various functions as described above with the same multi-function pin PRO after the power start-up stage, whereby the cost and circuit size can be reduced. After the power start-up is finished, the voltage on the multi-function pin PRO (i.e. the protection sensing signal VPRO) should be ensured not to turn ON the HV start-up switch SSU when the protection sensing signal VPRO does not exceed the protection threshold VTHP. In one embodiment, the protection threshold VTHP is determined according to a conduction threshold of the HV start-up switch SSU to ensure not to turn ON the HV start-up switch SSU when the protection sensing signal VPRO does not exceed the protection threshold VTHP. Note that according to the present invention, since the protection threshold VTHP relates to the conduction threshold of the HV start-up switch SSU, hence, when the protection sensing signal VPRO does not exceed the protection threshold VTHP, it is ensured not to turn ON the HV start-up switch SSU and it is ensured to enter the protection operations once the protection sensing signal VPRO exceeds the protection threshold VTHP; thus advantageously, the flyback power converter circuit does not need other devices such as a clamping circuit to ensure not to turn ON the HV start-up switch SSU.

The present invention has been described in considerable detail with reference to certain preferred embodiments thereof. It should be understood that the description is for illustrative purpose, not for limiting the scope of the present invention. It is not limited for each of the embodiments described hereinbefore to be used alone; under the spirit of the present invention, two or more of the embodiments described hereinbefore can be used in combination. For example, two or more of the embodiments can be used together, or, a part of one embodiment can be used to replace a corresponding part of another embodiment. As an example, the "whether the protection sensing signal is higher than the protection threshold VTHP" and the "whether the protection sensing signal is lower than the protection threshold VTHP" can be used together. In this case, the flyback power converter circuit of the present invention may include necessary circuits described in the aforementioned embodiments, such that the flyback power converter circuit can have these two functions at the same time. More specifically, as described earlier, these two functions can be performed according to different states of the protection sensing signal VPRO, whereby the flyback power converter circuit of the present invention can have these two functions in addition to rapid start-up with the same multi-function pin PRO. Furthermore, those skilled in this art can readily conceive variations and modifications within the spirit of the present invention. For example, in the aforementioned embodiments, the over temperature protection and the over voltage protection indicate over temperature protection and over voltage protection, respectively. However, according to the spirit of the present invention, under temperature protection or under voltage protection can be achieved by the same circuits. In this case, the polarities of the related circuits or signals may be adjusted accordingly to achieve the alternative functions. As another example, to perform an action "according to" a certain signal as described in the context of the present invention is not limited to performing an action strictly according to the signal itself, but can be performing an action according to a converted form or a scaled-up or down form of the signal, i.e., the signal can be processed by a voltage-to-current conversion, a current-to-voltage conversion, and/or a ratio conversion, etc. before an action is performed. The spirit of the present invention should cover all such and other modifications and variations, which should be interpreted to fall within the scope of the following claims and their equivalents.

What is claimed is:

1. A flyback power converter circuit, comprising:
   a transformer, having a primary side winding for receiving an input voltage; a secondary side winding for generating an output voltage; and an auxiliary winding for generating an auxiliary voltage and providing a controller supply voltage;
   a primary side switch, coupled to the primary side winding and configured to operably control the primary side winding;
   a high voltage (HV) start-up switch, wherein a current inflow terminal of the HV start-up switch is coupled to an input voltage related signal, and a current outflow terminal of the HV start-up switch is coupled to the controller supply voltage, wherein the input voltage related signal relates to the input voltage;
   a protection sensing circuit, configured to operably sense a system temperature or an input signal to generate a protection sensing signal; and
   a primary side controller circuit, which is located at a primary side of the transformer and powered by the controller supply voltage, and is configured to operably generate a switch control signal to control the primary side switch; the primary side controller circuit including:
      a multi-function pin, which is coupled to a control terminal of the HV start-up switch and is coupled to the protection control circuit, wherein the multi-function pin is configured to operably control the HV start-up switch for start-up operation during a start-up stage and configured to operably receive the protection sensing signal after the start-up stage, wherein the start-up stage corresponds to a time period when the controller supply voltage does not exceed the start-up voltage threshold;
      a high voltage (HV) start-up circuit, coupled to the control terminal of the HV start-up switch through the multi-function pin, wherein during the start-up stage, the HV start-up circuit controls the HV start-up switch to be ON, and after the start-up stage, the HV start-up circuit controls the HV start-up switch to be OFF; and
      a protection control circuit, configured to operably receive the protection sensing signal through the multi-function pin, wherein after the start-up stage, the protection control circuit performs the protection operation according to whether the protection sensing signal exceeds a protection threshold.

2. The flyback power converter circuit of claim 1, wherein the input voltage related signal is directly coupled to the input voltage.

3. The flyback power converter circuit of claim 1, further comprising a rectifier circuit which is configured to operably rectify an AC input signal to generate the input voltage, wherein the input voltage related signal is coupled to a positive terminal or a negative terminal of the AC input signal.

4. The flyback power converter circuit of claim 1, wherein the HV start-up circuit includes:
   a comparison circuit, configured to operably compare the controller supply voltage with a reference voltage to generate a comparison output signal, wherein the reference voltage has a level relating to the start-up voltage threshold; and
   a start-up control switch, wherein a current inflow terminal and a current outflow terminal of the start-up control switch are coupled between the controller supply voltage and the multi-function pin, and a control terminal of the start-up control switch is coupled to the comparison output signal, wherein when the controller supply voltage does not exceed the start-up voltage threshold, the start-up control switch is controlled to be ON to turn ON the HV start-up switch, and when the controller supply voltage exceeds the start-up voltage threshold, the start-up control switch is controlled to be OFF to turn OFF the HV start-up switch.

5. The flyback power converter circuit of claim 4, wherein a conduction threshold of the HV start-up switch is a negative value such that the HV start-up switch is ON when the control terminal of the HV start-up switch and the current outflow terminal of the HV start-up switch are shorted by controlling the start-up control switch to be ON.

6. The flyback power converter circuit of claim 1, wherein the protection control circuit includes:
   a biasing circuit, configured to operably provide a bias current and/or a bias voltage when the controller supply voltage exceeds the start-up voltage threshold, wherein the protection sensing circuit further generates the protection sensing signal according to the bias current and/or the bias voltage; and
   a comparison circuit, configured to operably compare the protection sensing signal with a reference voltage to generate a comparison output signal, wherein the reference voltage has a level relating to the protection threshold, and the protection control circuit performs the protection operation according to the comparison output signal.

7. The flyback power converter circuit of claim 6, wherein the biasing circuit includes a current source and a diode-connected transistor which are coupled to each other and are configured to operably generate the bias current and/or the bias voltage on the multi-function pin.

8. The flyback power converter circuit of claim 6, wherein the protection sensing circuit includes a temperature sensitive resistor, and wherein the protection control circuit determines whether the system temperature exceeds a temperature threshold according to whether the protection sensing signal exceeds the reference voltage, and the protection control circuit performs the protection operation when the system temperature exceeds the temperature threshold.

9. The flyback power converter circuit of claim 6, wherein the protection sensing circuit includes a sensing switch coupled between the multi-function pin and a predetermined voltage, the input signal being coupled to a control terminal of the sensing switch, wherein the protection control circuit determines whether the input signal exceeds an input signal threshold according to whether the protection sensing signal exceeds the reference voltage, and the protection control circuit performs the protection operation when the input signal exceeds the input signal threshold.

10. The flyback power converter circuit of claim 1, wherein the protection threshold is determined according to a conduction threshold of the HV start-up switch, such that when the controller supply voltage exceeds the start-up voltage threshold and when the protection sensing signal does not exceed the protection threshold, the HV start-up switch is OFF.

11. The flyback power converter circuit of claim 1, wherein when the controller supply voltage exceeds the start-up voltage threshold, the protection control circuit operates the primary side switch according to the protection sensing signal.

12. The flyback power converter circuit of claim 1, further comprising a reverse blocking diode which is coupled in series with the HV start-up switch to prevent a reverse current and/or to reduce a voltage applied on the HV start-up switch.

13. A primary side controller circuit configured to operably control a flyback power converter circuit which includes a transformer, having a primary side winding for receiving an input voltage; a secondary side winding for generating an output voltage; and an auxiliary winding for generating an auxiliary voltage and providing a controller supply voltage; a primary side switch, coupled to and configured to operably control the primary side winding; a high voltage (HV) start-up switch, wherein a current inflow terminal of the HV start-up switch is coupled to an input voltage related signal, and a current outflow terminal of the HV start-up switch is coupled to the controller supply voltage, wherein the input voltage related signal relates to the input voltage; and a protection sensing circuit, configured to operably sense a system temperature or an input signal to generate a protection sensing signal; the primary side controller circuit being located at a primary side of the transformer and powered by the controller supply voltage, and being configured to operably generate a switch control signal to control the primary side switch; the primary side controller circuit comprising:

a multi-function pin, which is coupled to a control terminal of the HV start-up switch and is coupled to the protection control circuit, wherein the multi-function pin is configured to operably control the HV start-up switch for start-up operation during a start-up stage and configured to operably receive the protection sensing signal after the start-up stage, wherein the start-up stage corresponds to a time period when the controller supply voltage does not exceed the start-up voltage threshold;

a high voltage (HV) start-up circuit, coupled to the control terminal of the HV start-up switch through the multi-function pin, wherein during the start-up stage, the HV start-up circuit controls the HV start-up switch to be ON, and after the start-up stage, the HV start-up circuit controls the HV start-up switch to be OFF; and a protection control circuit, configured to operably receive the protection sensing signal through the multi-function pin, wherein after the start-up stage, the protection control circuit performs the protection operation according to whether the protection sensing signal exceeds a protection threshold.

14. The primary side controller circuit of claim 13, wherein the input voltage related signal is directly coupled to the input voltage.

15. The primary side controller circuit of claim 13, wherein the flyback power converter circuit further comprises a rectifier circuit which is configured to operably rectify an AC input signal to generate the input voltage, wherein the input voltage related signal is coupled to a positive terminal or a negative terminal of the AC input signal.

16. The primary side controller circuit of claim 13, wherein the HV start-up circuit includes:

a comparison circuit, configured to operably compare the controller supply voltage with a reference voltage to generate a comparison output signal, wherein the reference voltage has a level relating to the start-up voltage threshold; and a start-up control switch, wherein a current inflow terminal and a current outflow terminal of the start-up control switch are coupled between the controller supply voltage and the multi-function pin, and a control terminal of the start-up control switch is coupled to the comparison output signal, wherein when the controller supply voltage does not exceed the start-up voltage threshold, the start-up control switch is controlled to be ON to turn ON the HV start-up switch, and when the controller supply voltage exceeds the start-up voltage threshold, the start-up control switch is controlled to be OFF to turn OFF the HV start-up switch.

17. The primary side controller circuit of claim 13, wherein the protection control circuit includes:

a biasing circuit, configured to operably provide a bias current and/or a bias voltage when the controller supply voltage exceeds the start-up voltage threshold, wherein the protection sensing circuit further generates the protection sensing signal according to the bias current and/or the bias voltage; and a comparison circuit, configured to operably compare the protection sensing signal and a reference voltage to generate a comparison output signal, wherein the reference voltage has a level relating to the protection threshold, and the protection control circuit performs the protection operation according to the comparison output signal.

18. The primary side controller circuit of claim 17, wherein the biasing circuit includes a current source and a diode-connected transistor which are coupled to each other and are configured to operably generate the bias current and/or the bias voltage on the multi-function pin.

19. The primary side controller circuit of claim 17, wherein the protection sensing circuit includes a temperature sensitive resistor, and wherein the protection control circuit determines whether the system temperature exceeds a temperature threshold according to whether the protection sensing signal exceeds the reference voltage, and the protection control circuit performs the protection operation when the system temperature exceeds the temperature threshold.

20. The primary side controller circuit of claim 17, wherein the protection sensing circuit includes a sensing switch coupled between the multi-function pin and a predetermined voltage, the input signal being coupled to a control terminal of the sensing switch, wherein the protection control circuit determines whether the input signal exceeds an input signal threshold according to whether the protection sensing signal exceeds the reference voltage, and the protection control circuit performs the protection operation when the input signal exceeds the input signal threshold.

21. The primary side controller circuit of claim 13, wherein the protection threshold is determined according to a conduction threshold of the HV start-up switch, such that when the controller supply voltage exceeds the start-up voltage threshold and when the protection sensing signal does not exceed the protection threshold, the HV start-up switch is OFF.

22. The primary side controller circuit of claim 13, wherein when the controller supply voltage exceeds the start-up voltage threshold, the protection control circuit operates the primary side switch according to the protection sensing signal.

* * * * *